March 9, 1965

C. J. DE CARO ETAL 3,172,120

EXPLOSIVE ACTUATED TOOL

Original Filed Dec. 31, 1956

INVENTORS.
CHARLES J. DE CARO
ROBERT W. HENNING
BY Donald R. Motsko

ATTORNEY

March 9, 1965  C. J. DE CARO ETAL  3,172,120
EXPLOSIVE ACTUATED TOOL
Original Filed Dec. 31, 1956  4 Sheets-Sheet 2

INVENTORS.
CHARLES J. DE CARO
ROBERT W. HENNING
BY Donald R. Motsko
ATTORNEY

March 9, 1965    C. J. DE CARO ETAL    3,172,120
EXPLOSIVE ACTUATED TOOL

Original Filed Dec. 31, 1956    4 Sheets-Sheet 3

INVENTORS,
CHARLES J. DE CARO
ROBERT W. HENNING
BY Donald R. Motoko

ATTORNEY

March 9, 1965   C. J. DE CARO ETAL   3,172,120
EXPLOSIVE ACTUATED TOOL
Original Filed Dec. 31, 1956   4 Sheets-Sheet 4

INVENTOR.
CHARLES J. DE CARO
ROBERT W. HENNING
BY
Donald R. Motsko

ATTORNEY

United States Patent Office 3,172,120
Patented Mar. 9, 1965

3,172,120
EXPLOSIVE ACTUATED TOOL
Charles J. De Caro, Orange, and Robert W. Henning, North Haven, Conn., assignors to Olin Mathieson Chemical Corporation, a corporation of Virginia
Original application Dec. 31, 1956, Ser. No. 631,881, now Patent No. 3,060,436, dated Oct. 30, 1962. Divided and this application Aug. 1, 1963, Ser. No. 299,434
3 Claims. (Cl. 1—44.5)

This invention relates to fluid powered devices and more particularly to fluid powered fastener driving tools.

This application is copendent with application Serial No. 215,756, filed July 2, 1962, and divided out of parent application Serial No. 631,881, filed December 31, 1956, now U.S. Patent No. 3,060,436, granted October 30, 1962.

The present tool is of the type wherein an explosive cartridge provides the power for driving a fastener or similar driven element and more particularly wherein the explosive force is directed against a piston of substantially greater mass than the fastener, with the piston driving the fastener. In tools of this type difficulty may be encountered in dissipating the explosive force after the fastener has been driven. The explosive gases are discharged through a relatively large opening in the side of the barrel at a point relatively close to the barrel breech. The release of the gases results in a very loud report and a flame and glowing particles which are annoying and which could cause injury to the operator of the tool or to material close to the discharge opening. Difficulty may also be encountered in stopping the forward travel of the piston after detonation of the cartridge. Such forward travel is usually stopped in one of two ways, either by the resistance of the fastener or other driven element, particularly a headed portion of such an element engaging a surface into which it is being driven, or alternately by a portion of the piston engaging an abutment in the muzzle end of the barrel. The first mode of stopping the travel of the piston is objectionable because the driven element may be driven too far into the workpiece and in the case of a fastener the head may be driven through the surface of the workpiece. In stopping the travel of the piston by engagement with an abutment in the muzzle of the barrel a great deal of shock results and possible damage to the tool or premature fatigue of the parts of the tool is likely, as well as discomfort to the operator.

A very serviceable and effective firing mechanism for tools in which a fastener is driven through a bore in the tool by an explosive force directed against the fastener itself utilizes a cocking rod secured to the barrel. In piston-type tools this has not been found to be satisfactory because upon detonation of the cartridge the barrel is driven rearwardly against the breech block, and upon abruptly stopping the piston the barrel is driven forwardly. The resultant shock to which the barrel is subjected has resulted in a cocking rod attached to the barrel of a piston type tool becoming loose in its mounting and it has been found that under these circumstances the rod should be mounted in a portion of the tool which is not subjected to such severe shock.

The present invention is directed to overcoming these difficulties and providing an improved tool. The shock resulting in stopping the forward travel of the piston under the force of the explosive charge is reduced by providing a plurality of hard washers between an abutment in the muzzle end of the barrel bore and a cooperating abutment portion on the piston. The impulse forces between the washers, or in other words, the rattling effect between the washers, absorbs this shock. The burning explosive gases which drive the piston are dissipated through an opening in the side of the barrel and then through a blast chamber which reduces the report of the explosion and confines any flames or glowing particles of the explosive matter in the chamber. The firing mechanism has been improved by mounting the entire mechanism in the tool housing with no parts on the barrel or other portions of the tool which are subjected to excessive shock.

It is an object of this invention to provide an improved tool for driving fasteners or similar driven elements.

Another object of this invention is to provide an improved means for dissipating shock in piston type driving tools.

Another object of this invention is to provide a quieter and safer tool.

Another object of this invention is to provide an improved firing mechanism.

Additional objects and advantages will be apparent from the following description and drawings in which.

Figure 1:
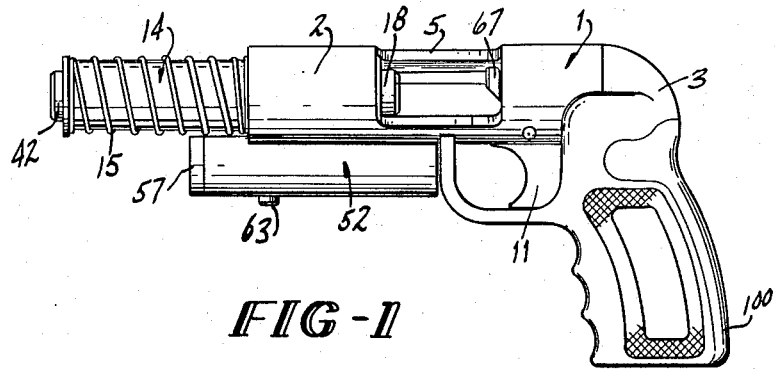
FIGURE 1 is a side view of an embodiment of the tool in the inoperative or safe position.
Figure 2:
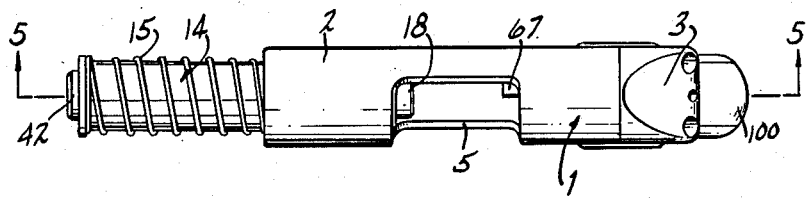
FIGURE 2 is a top view of the tool shown in FIGURE 1.
Figure 4:
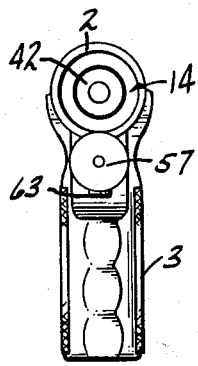
FIGURE 4 is a front or muzzle end view of the tool shown in FIGURE 1.
Figure 3:
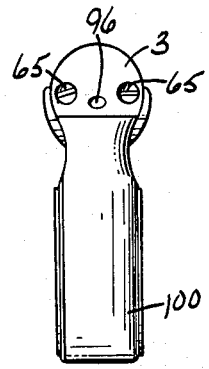
FIGURE 3 is a rear or breech end view of the tool shown in FIGURE 1.
Figure 5:
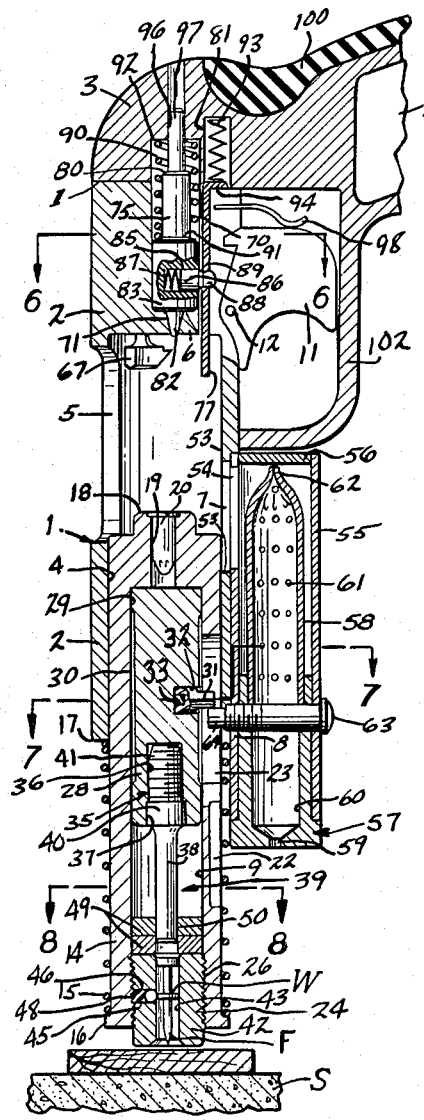
FIGURE 5 is a sectional schematic view of the tool taken on the line 5—5 in FIGURE 2.
Figure 6:
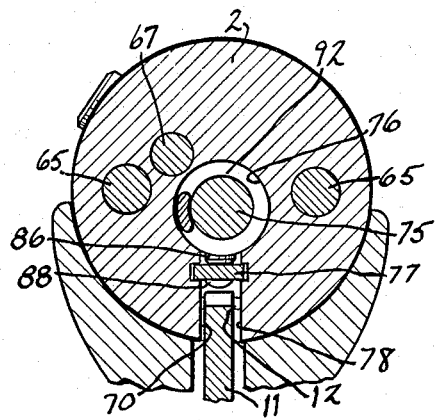
Figure 7:
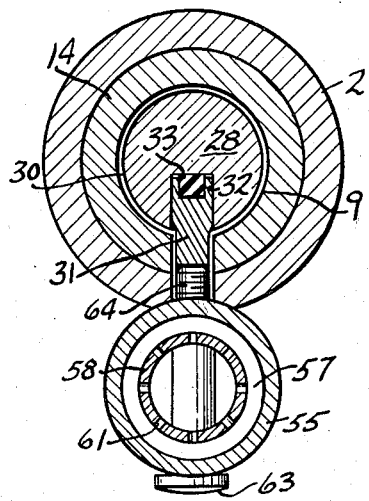
Figure 8:
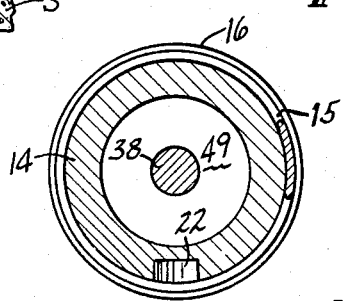
Figure 9:
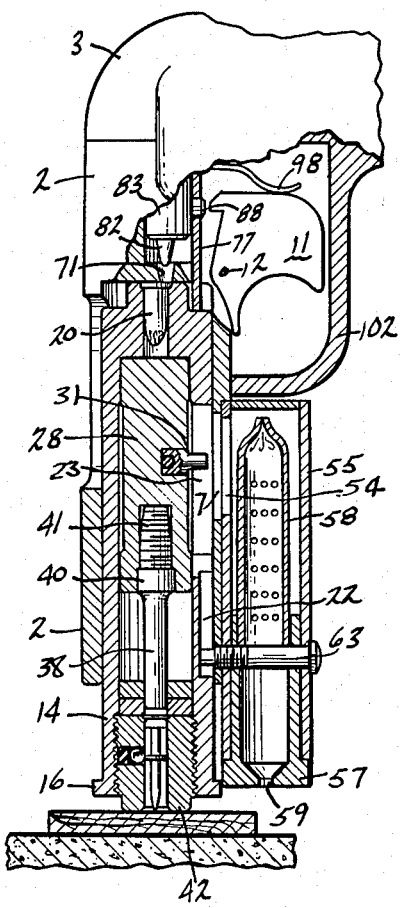
Figure 10:
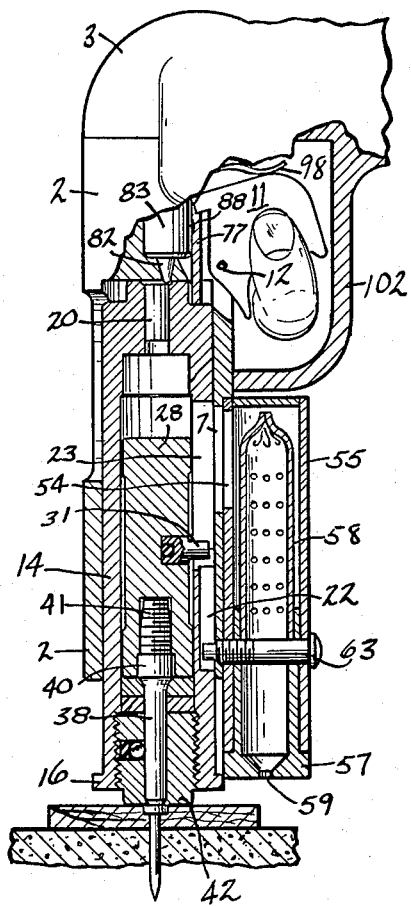
Figure 11:
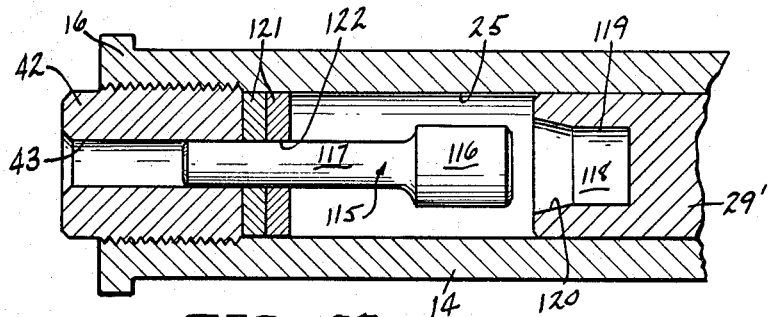
Figure 12:
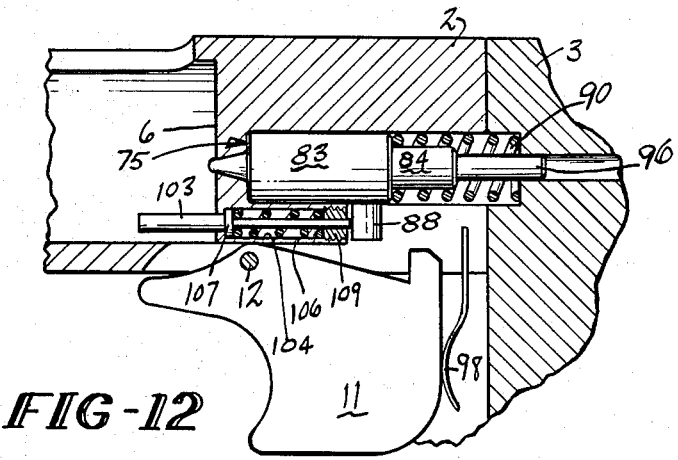
Figure 13:
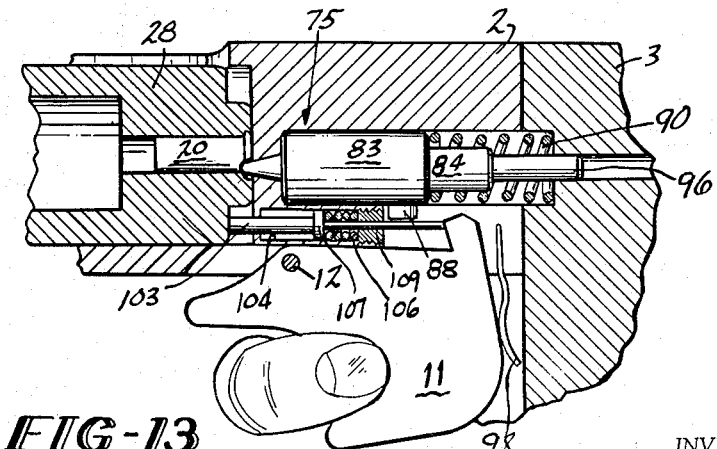

FIGURES 6, 7, and 8 are sectional views taken respectively on the lines 6—6, 7—7, and 8—8 in FIGURE 5;

FIGURE 9 is a sectional schematic view similar to FIGURE 5, but showing the tool in the operative or ready-to-fire position;

FIGURE 10 is a sectional schematic view similar to FIGURES 5 or 9, but showing the tool immediately after firing;

FIGURE 11 is a sectional schematic view of the muzzle end of the tool and illustrates another embodiment of a portion of the tool;

FIGURE 12 is a sectional schematic view of the breech end of the tool and illustrates still another embodiment of a portion of the tool; and FIGURE 13 is a sectional schematic view of the embodiment of FIGURE 12, but showing the tool immediately after firing.

Referring to FIGURES 1–10 in the drawing, and particularly FIGURE 5, the tool includes a barrel 14 and housing 1 including a forward portion 2 and a hand grip and trigger guard portion 3. The forward housing portion 2 has a tubular bore 4, a large elongated side opening 5, a breech block closure portion 6, a fluid discharge opening 7 on the same side as the hand grip, and screw threaded aperture 8. A trigger 11 is pivotably mounted in the forward housing portion 2 on the same side as the hand grip by a pivot pin 12. A barrel 14 having bore 9 is slidably mounted in the forward housing bore 4 and is normally inoperatively positioned outwardly with respect to the housing 2 by a spring 15 surrounding the barrel and engaging a flange 16 on the muzzle end of the barrel and a shoulder 17 on the muzzle end of the forward housing portion 2. The breech end 18 of the barrel 14 has a chamber 19 for receiving an explosive cartridge 20. The outer surface of the barrel has a longitudinal slot 22. A portion of this slot is cut through the barrel wall to provide an opening 23 which is aligned with the opening 7 in the housing when the tool is in the operative position, as shown in FIGURE 9. The longitudinal bore 9 opens through the muzzle end of the barrel and has a closed breech end except for the opening provided by the cartridge chamber 19. The muzzle end of the barrel bore is provided with screw threads 24.

A piston 28 is slidably received in the barrel bore 9 with a sealing fit at its extremities 29. The midportion 30 of the piston is reduced and does not engage the bore 9. A detent 31 is received in a socket 32 in the piston. An outwardly protruding end of the detent is received in the portion 23 of slot 22 in the barrel 14 and is resiliently urged outwardly by a resilient plug 33 such as neoprene rubber. In one embodiment of the invention shown in FIGURE 5, the muzzle end of the piston 28 is provided with a stepped socket 35. The innermost portion of the socket is threaded at 36 and is smaller than the outer portion 37. A piston rod 39 has a forward shank portion 38, an enlarged shoulder 40, and a threaded rear portion 41. The shoulder 40 tightly engages the forward piston socket portion 37 and is screwed into the socket by the cooperating threaded portions 36 and 41.

The piston 28 is retained in the barrel bore 9 by a threaded metal plug 42. The metal plug is screwed into the threads 24 in the muzzle end of the barrel bore 9. The plug is formed of a soft, tough steel. A bore 43 is formed through the center of the plug to slidably receive the piston shank 39 with a close sliding fit to prevent bending the piston rod while driving a fastener or other driven element. The extremities of the bore 43 may be beveled as indicated in the drawing. A ball 45 is received in a bore 46 drilled through the plug 42 from the outside inwardly leaving a shoulder at the inner end in the bore 43 to retain the ball in the bore. The ball is resiliently urged outwardly by a rubber plug 48. Between the metal plug 42 and piston 28 are two hard metal impact washers 49 of tool steel or the like such as a special alloy, water-hardening steel known as "Solar" and sold under that trade name by Carpenter Steel Company of Reading, Pennsylvania. These washers closely engage the barrel bore 9 and are provided with central bores 50 aligned with the metal plug bore 43 to receive the piston rod shank 39.

A blast chamber 52 is secured to the housing 2 in any appropriate manner as by welds 53 and has an opening 54 aligned with the opening 7 in the housing. The blast chamber comprises a cylindrical member 55 which includes the opening 54. The cylinder 55 is closed at its rear end by a plug 56 welded therein. Received in the forward or breech end of the cylinder is a blast chamber bushing 57 to which is secured a chamber tube 58. The bushing 57 has an opening 59 and a hollow socket-like portion 60. The chamber tube 58 is secured in the socket 60 in any appropriate manner as by a sweat fit or welding. A plurality of holes 61 are formed in the chamber tube 58 and the rear end of the tube is sealed as by a crimp 62. A bolt 63 passes through aligned pairs of apertures in the cylindrical member 55, and the bushing 57, and is threaded only into the threaded opening 8. A reduced nose 64 on the inner end of the bolt 63 projects into the slot 22 in the barrel 14 and is adapted to engage the detent 31 for a purpose to be described hereinafter. Although tube 58 is preferred, chamber 52 may contain a porous packing such as metallic wool or the like.

The forward portion 2 of the housing has mounted therein an extractor 67 of any appropriate type for withdrawing the expended cartridge 20 from the chamber 19 in the barrel. The rear end of the forward portion of the housing 2 includes a cut-out portion 70 as best illustrated in FIGURE 6. The breech block 6 of the forward housing portion 2 includes a frusto-conical bore 71 opening into the cylindrical part of the cut-out 70. A firing pin 75 is slidably received in a cylindrical portion 76 (see FIGURE 6) of the cut-out 70. An L-shaped rod 77 is slidably received in a bifurcated portion 78 of the cut-out 70.

The hand grip and trigger portion 3 of the housing 1, extending to one side with chamber 52, is secured to the rear of forward portion 2 of the housing by a pair of bolts 65 passing through the grip 3 and threaded into the forward part 2. The hand grip portion 3 of the housing includes sockets 80 and 81.

The firing pin 75 comprises a frusto-conical nose portion 82, a first cylindrical body potrion 83 and a second cylindrical body portion 84 of smaller diameter than the portion 83 as shown enlarged in FIGURES 12 and 13. A socket 85 is formed in the larger cylindrical body portion 83 and receives a detent 86 which is resiliently urged outwardly by a spring 85 (see FIGURE 5). In the inoperative position shown in FIGURE 5, a reduced portion 88 of the detent 86 engages a hole 89 in the cocking rod 77. The firing pin is constantly urged forwardly and toward the muzzle by a spring 90 engaging a shoulder 91 provided by the juncture of the large cylindrical portion 83 and the smaller cylindrical portion 84, and a shoulder 92 in the breech end of the socket 80. The L-shaped cocking rod 77 is similarly constantly urged forwardly or toward the muzzle of the tool by a spring 92 engaging an arm 94 (see FIGURE 5) on the cocking rod and the base of the socket 81. The rear end of the firing pin 75 has a thin cylindrical extension 96 which is clearly visible in a bore 97 in the rear housing member 3 to indicate when the tool is properly cocked and to aid in maintaining the firing pin in proper alignment. The trigger 11 is normally maintained in the position shown in FIGURE 5 by a leaf spring 98 which may be secured to the housing member in any appropriate manner and is here shown as being received in a slot in the bifurcated portion 78 of the forward housing member cut-out portion 70. The hand grip 3 may be provided with a resilient insert 100 to relieve the shock which would otherwise be transmitted to the operator's hand. The hand grip 3 is also provided with a relieved area 101 to reduce the weight of the tool and a trigger guard 102.

Referring to the embodiment shown in FIGURE 11, a floating piston rod 115 has a cylindrical portion 116 on its posterior end and a smaller second cylindrical portion 117 on its front end. A socket 119 is provided in the front portion 29' of a piston that otherwise corresponds to the piston 28. The base 118 of the socket 119 is of substantially the same diameter as the cylindrical portion 116 of the piston rod. The forward or open end portion 120 of the socket 119 is flared outwardly to facilitate receiving the rear end of the floating piston rod and similarly the rear edges of the piston rod may be beveled. Washers 121 are provided to absorb any shock as previously described, although they would not normally be required because the driven member stops the rod 115. The length of the cylindrical portion 117 is such that when the piston with its portion 29' is in its rearmost position the floating piston rod 115 remains aligned with the center opening of the washers 121 following the muzzle plug 42. The rod 115 is maintained in proper alignment through engagement of its forward end with the bores 122 and bore 43 in the washers and the muzzle plug, respectively. In using different size fasteners or other driven elements it is a simple matter to change the muzzle plug 42 and piston rod 115 by merely unscrewing the plug.

In the firing mechanism embodiment shown in FIGURES 12 and 13 a rod 103 has a circumferential enlargement 107 and is slidably mounted in a socket 104 in the forward housing portion 2. A spring 106 is received on the rod and is maintained in engagement with the enlargement 107 by a plug 109 threaded into the housing. Upon rearward movement of the barrel the cocking rod 103 is moved rearwardly and through engagement with the detent 88, moves the firing pin 75 rearwardly and into the ready-to-fire position and upon depressing the trigger 11 the firing pin detent 88 is released and the firing pin moves to the position shown in FIGURE 12.

The operation of the tool and functioning of its various components is as follows: With the tool in the inoperative position shown in FIGURE 5 a cartridge 20 is inserted through the opening 5 in the housing 1 and into the chamber 19 in the barrel breech end 18. A fastener or other driven element F is inserted into the bore 43 in the muzzle plug 42. The fastener may be provided with a washer W (FIGURES 5, 9, and 10) secured on its shank with a very tight sliding fit so that when the fastener is driven into a work surface S the washer will be forced against the head of the fastener. The washer is so positioned that it engages the ball 45 maintaining the fastener properly positioned in the muzzle plug. The tool is then grasped by the operator and the muzzle 42 is properly positioned on the work surface S. The operator then presses on the housing grip portion 3 causing the forward housing portion 2 to telescope over the barrel 14 until the barrel breech end 18 engages the breech block 6 in the housing 1 as shown in FIGURE 9. Shortly before the barrel breech end 18 engages the breech block 6, the barrel breech end engages the forward end of the cocking rod 77 forcing the cocking rod from further movement with the housing thereby compressing the spring 93. The firing pin 75 simultaneously is stopped from further approaching the barrel breech end and thereby compresses the spring 90 because the nose 88 of the firing pin detent 86 is in the cocking rod hole 89.

With the tool in the position shown in FIGURE 9, the operator merely pulls trigger 11, as shown in FIGURE 10, causing the trigger to engage the firing detent nose 88 and disengage it from the cocking rod hole 89, whereupon the force of the firing pin spring 90 drives the firing pin 75 forward until the firing pin nose 82 strikes the cartridge 20 detonating the explosive charge contained therein.

The force of the explosive charge drives the piston 28 through the barrel bore 9 and toward the muzzle plug 42. The muzzle end of the piston rod 38 strikes the head of the fastener F, or other driven member, to drive the fastener into the work surface S. The travel of the piston 28 is stopped by engagement of the piston with a series of washers backed up by the muzzle plug after initial engagement with washers 49. The impact, or rattling effect, between the hard washers 49 substantially reduces the shock which would otherwise occur if the piston 28 engaged the muzzle plug 42. This resultant shock is also reduced by the soft, tough muzzle plug through the peening effect of the muzzle end washer 49 against the plug. It has been found that when only one washer 49 was used, although the shock was somewhat retarded, a single washer would expand and increase its diameter to the extent that it jammed in the barrel bore 9 and become ineffective in reducing the shock. When two washers are used, neither washer increases its diameter to the extent that it jammed in the barrel bore. The more washers that are used the greater is the reduction in the shock occurring in stopping the forward travel of the piston 28. It is therefore desirable to use as great a number of thin washers as is possible. However, the washers must have sufficient thickness to remain perpendicular to the barrel bore. If they are too thin they are likely to turn askew in the bore 9 and on the piston rod 38.

Upon detonation of the cartridge 20, the explosive force is applied in its entirety against the piston only a short portion of its entire travel through the barrel bore. As the piston 28 moves toward the muzzle of the bore the breech end of the piston passes the breech end of the opening 23 through the barrel side wall permitting the explosive gases to escape through the openings 7 and 54 in the forward housing portion 2 and in the blast chamber cylinder 55 respectively. As the gases pass into the blast chamber they pass through the holes 61 in the chamber tube 58 and into the central portion of the chamber tube, then through the socket 60 in the bushing 57, and out through the holes 59 in the bushing. The blast is thereby deflected away from the operator and the noise of the blast is substantially reduced. The blast chamber further prevents any glowing particles of explosive matter or flame resultant from the explosion from escaping from the tool thereby eliminating any possibility of injury to nearby personnel or material.

After firing the tool the operator releases the trigger 11 which is returned to the position shown in FIGURE 9 by the spring 98. He then withdraws the tool from the work surface whereupon the spring 15 about the barrel 14 forces the barrel forward with respect to the housing 1 and permits the extractor 67 to withdraw the expanded cartridge 20 from the chamber 19 in the barrel. Upon detonation of the cartridge 20, the firing pin is in its inoperative or forward position as shown in FIGURE 10 and upon forward movement of the barrel 14, the cocking rod spring 93 drives the cocking rod forward in the housing 1 until the cocking rod arm 94 engages an abutment in the housing. With the cocking rod in its forwardmost position, the firing pin detent 88 again engages in the hole 89 in the cocking rod.

After firing the tool the piston 28 is in engagement with the rearmost washer 49, that is, it is positioned forward in the barrel bore 9. Upon forward movement of the barrel 14 with respect to the housing 1 the piston detent 31 engages the nose of the bolt 63 which protrudes into the slot 22, preventing the piston 28 from moving with the barrel 14 so that when the barrel is in its full inoperative position the piston 28 will again be adjacent the breech end of the barrel as shown in FIGURE 5. The tool is now ready to be reloaded for driving another fastener or other driven element.

The functioning of the firing pin mechanism shown in FIGURES 12 and 13 is substantially the same as that shown in the previous described embodiment. As the housing 1 moves forwardly with respect to the barrel 14, the breech end of the barrel engages the forward end of the cocking rod 103 causing the rod to stop and move only relatively with respect to the socket 104, against the resistance of the spring 106, compressing it in socket 104, to engage the firing pin detent 88 and thereby stop the firing pin with respect to the forwardly telescoping housing and until the parts are placed into the ready-to-fire position as shown in FIGURE 9. The operator then depresses the trigger 11 releasing the firing pin to permit the spring 90 to drive the firing pin 75 forward in the housing 1 and into engagement with the cartridge 20.

In the piston rod embodiment shown in FIGURE 11 the rod 115 floats free in the muzzle plug 42. The illustration semi-diagrammatically shows the piston and rod to be of detachable and free-floating character which is responsible for avoidance of need for a more positive connection and by which breadage is minimized. As the piston 28 moves forward in the barrel bore 9, the cylindrical portion 116 of the piston rod is seated in the cylindrical socket 119 in the piston and the rod is driven forward against the fastener. In view of the length of the parts shown in FIGURES 5 and 11, rod 115 may become altogether disconnected from socket 119 since the tip of 117 remains aligned in the washer bore 122. As explained previously, in driving different size fasteners, it is necessary to use different size muzzle plugs and a piston rod of substantially the same diameter as the muzzle plug bore 43 and the washer bores 122. If the rod is of substantially less diameter it may bend while driving the fastener or other driven element into the surface S.

To disassemble the tool the bolt 63 is backed out of the threaded housing bore 8 to permit the barrel to pass over the bolt whereupon the detent is moved to a position aligned with an enlargement in the opening 23. The barrel is then removed from the housing bore 4 and the detent permitted to drop out of the socket 32 through the enlargement in the opening 23. Upon removal of the muzzle plug 42, the piston may be removed. In order to remove the firing pin and cocking rod, the bolts 65 are removed and the housing grip portion 3 is removed from the forward housing portion 2. The springs 90 and 93 may then be removed from their respective socket in the grip housing portion 3 and the firing pin 75 and cocking rod 77 may be removed from the forward housing portion 2. In the cocking rod embodiment shown in FIGURES 12 and 13 it is necessary to remove the plug 109 before removing either the spring 106 or the cocking rod 103.

It is notable that opening 54 in blast chamber member 55 is axially elongated like barrel opening 7 to offer the driver piston 28 during the last part of its movement an ever increasing discharge vent into the chamber 52 which is even more elongated to obtain a large volume without too much lateral bulk. The increasing vent assures complete dissipation of residual pressure. The chamber 52 acting between the muzzle and breech end thus cooperates with the muzzle arrangement to minimize the likelihood of damaging shock between the piston and the muzzle abutment.

Although this invention has been described with particular reference to certain embodiments, materials, and details, various changes will be apparent to one skilled in the art and the invention is therefore not to be limited to such embodiments, materials, and details except as set forth in the appended claims.

What is claimed is:

1. An explosive actuated tool having a barrel, means mounted adjacent said barrel for discharging an explosive gas into said barrel, a piston slidably mounted in said barrel to form a closed chamber with said barrel and be driven forcibly by said gas discharged initially into said chamber, an opening in a sidewall of said barrel for ultimate venting said gases from said chamber, a blast chamber mounted on the side of said tool adjacent said opening, an opening in a sidewall of said chamber communicating with said barrel opening to receive said gas, said blast chamber including means to deaden the noise and retard the force of said gas discharged from said tool, and a second opening in said blast chamber to discharge said gas after it has passed through the chamber.

2. An explosive actuated tool having a housing, a barrel slidably mounted in said housing for movement between a forward inoperative position and a rearward ready to fire position, means mounted adjacent one end of said barrel for discharging an explosive gas into said barrel, a piston slidably mounted in said barrel for movement between a first and second position to form in said second position a closed chamber with said barrel and be driven forcibly in said barrel to said second position by explosive gases discharged initially into said chamber, an opening formed in the sidewall of said barrel and housing for ultimately venting said chamber of said explosive gases, a blast chamber mounted on the side of said housing, a first opening in a sidewall of said blast chamber communicating with the opening in said barrel and housing to receive said explosive gases and a second opening in an end wall of said blast chamber to discharge said explosive gases, means mounted in said blast chamber to deaden the noise and retard the force of said explosive gases discharged from said tool.

3. The tool of claim 2 in which said means is a cylindrical member closed at one end and positioned concentrically in said chamber, said member having a sidewall with a plurality of openings formed therein, an open end of said member being directed downward toward said second opening.

References Cited by the Examiner
UNITED STATES PATENTS

| | | | |
|---|---|---|---|
| 722,567 | 3/03 | Crawford | 60—29 X |
| 1,811,762 | 6/31 | Schnell | 60—29 X |
| 1,901,138 | 3/33 | Barnes | 1—44.5 X |
| 2,692,383 | 10/54 | Catlin | 1—44.5 |

GRANVILLE Y. CUSTER, JR., *Primary Examiner.*